United States Patent
Lin et al.

(10) Patent No.: US 9,442,177 B2
(45) Date of Patent: Sep. 13, 2016

(54) INDOOR ROBOT AND METHOD FOR INDOOR ROBOT POSITIONING

(71) Applicants: KINPO ELECTRONICS, INC., New Taipei (TW); CAL-COMP ELECTRONICS & COMMUNICATIONS COMPANY LIMITED, New Taipei (TW)

(72) Inventors: Chuan-Kai Lin, New Taipei (TW); Hsuan-Po Chen, New Taipei (TW); Yu-Lun Ting, New Taipei (TW); Sheng-Chih Hsu, New Taipei (TW); Chang-Wan Chen, New Taipei (TW)

(73) Assignees: KINPO ELECTRONICS, INC., New Taipei (TW); CAL-COMP ELECTRONICS & COMMUNICATIONS COMPANY LIMITED, New Taipei (TW)

( * ) Notice: Subject to any disclaimer, the term of this patent is extended or adjusted under 35 U.S.C. 154(b) by 0 days.

(21) Appl. No.: 14/336,027

(22) Filed: Jul. 21, 2014

(65) Prior Publication Data

US 2015/0323934 A1 Nov. 12, 2015

(30) Foreign Application Priority Data

May 9, 2014 (TW) ............... 103116558 A (51) Int. Cl.
*G05D 1/02* (2006.01)
*G01S 5/00* (2006.01)
*G01S 5/02* (2010.01)

(52) U.S. Cl.
CPC .. *G01S 5/00* (2013.01); *G01S 5/02* (2013.01); *G05D 1/02* (2013.01); *G05D 1/0274* (2013.01); *G05D 1/0276* (2013.01)

(58) Field of Classification Search
CPC ..... G05D 1/0276; G05D 1/0274; G01S 5/00
USPC ......................................................... 701/26
See application file for complete search history.

(56) References Cited

U.S. PATENT DOCUMENTS

| | | | |
|---|---|---|---|
| 4,862,373 A | 8/1989 | Meng | |
| 5,467,273 A * | 11/1995 | Faibish | G01S 17/06 180/169 |

(Continued)

FOREIGN PATENT DOCUMENTS

| | | |
|---|---|---|
| TW | 201035581 A1 | 10/2010 |
| TW | 201334748 A1 | 9/2013 |
| TW | I415590 | 11/2013 |

OTHER PUBLICATIONS

McGillem and Rappaport, A Beacon Navigation Method for Autonomous Vehicles, Aug. 1989, IEEE Transactions on Vehicular Technology, vol. 38, No. 3.*

*Primary Examiner* — Behrang Badii
*Assistant Examiner* — Michael Berns
(74) *Attorney, Agent, or Firm* — Li & Cai Intellectual Property (USA) Office (57) ABSTRACT

An indoor robot and a method for indoor robot positioning are provided in the disclosure. The indoor robot is capable of executing different positioning modes according to the number of the detected beacons for indoor robot positioning. When the number of the detected beacons is less than a positioning required number, the indoor robot moves a predetermined distance according to the detected beacons to obtain a plurality of sets of distance data, thereby positioning the location of the indoor robot.

16 Claims, 9 Drawing Sheets

(56) References Cited

U.S. PATENT DOCUMENTS

| | | | | |
|---|---|---|---|---|
| 5,559,696 A * | 9/1996 | Borenstein | ............ | G01C 21/12 701/23 |
| 7,292,187 B2 * | 11/2007 | Recker | ............ | G01S 5/14 342/458 |
| 7,429,843 B2 * | 9/2008 | Jones | ............ | G05D 1/0219 318/568.1 |
| 8,983,504 B2 * | 3/2015 | Alizadeh-Shabdiz | | G01S 5/0278 455/418 |
| 2002/0095239 A1 | 7/2002 | Wallach et al. | | |
| 2006/0201007 A1 * | 9/2006 | Piekutowski | ............ | E02F 3/847 33/286 |
| 2007/0271011 A1 | 11/2007 | Lee et al. | | |
| 2008/0018879 A1 * | 1/2008 | Kim | ............ | G01S 7/003 356/4.01 |
| 2013/0138247 A1 * | 5/2013 | Gutmann | ............ | G05D 1/0231 700/253 |

* cited by examiner

INDOOR ROBOT AND METHOD FOR INDOOR ROBOT POSITIONING

CROSS-REFERENCE TO RELATED APPLICATION

This application claims the priority benefit of Taiwan application serial no. 103116558, filed on May 9, 2014. The entirety of the above-mentioned patent application is hereby incorporated by reference herein and made a part of this specification.

BACKGROUND

1. Technical Field

The present disclosure relates to an indoor robot, in particular, to an indoor robot and a method for the same for adjusting positioning modes according to the number of beacons.

2. Description of Related Art

With the progress of technology, the smart appliance robot technology is more and more advanced and the product is more and more popular. One type is the cleaning robot. In many movable devices, the robot is usually equipped with a driving device, a distance detector, and a movement controller for automatically moving. For example, the cleaning robot is one kind of the cleaning device that can move automatically without users' operation to collect the dust off the floor.

There are many types of positioning methods, one of them is the patent number TW 1415590 disclosing a method for operating an automatically displaceable domestic appliance, in which the automatically displaceable domestic appliance moves along the edge of the wall when missing the signal from beacons, in order to move back to the base station or find the positioning beacons.

However, in the case that the number of beacons is not enough to position the cleaning robot itself, the cleaning robot must move back to the base station or a specific area for re-positioning or re-exploring.

SUMMARY

Accordingly, exemplary embodiments of the present disclosure provide an indoor robot with a plurality of position modes for positioning according to the number of beacons during the exploration, and the method for indoor robot positioning thereof. The indoor robot can position itself accurately while the number of beacons is less than a position mode with multiple beacons demanded, in order to achieve the purpose of exploration.

An exemplary embodiment of the present disclosure provides a method for indoor robot positioning, the indoor robot is configured to an indoor space and a plurality of beacons are configured to the indoor space, and the indoor robot comprises a memory for storing the plurality of positioning modes, the method comprises the following steps. The indoor map and the coordinates of the plurality of beacons are generated. The location of beacons are determined whether within a line-of-sight or not and the number of the detected beacons within the line-of-sight area are obtained. And, the indoor robot performs one of the plurality of positioning modes according to the number of the detected beacons, wherein when the number of the detected beacons is more than zero and less than a positioning required number, the indoor robot moves a predetermined distance according to the detected beacons to position the location of the indoor robot.

In the exemplary embodiment of the present disclosure, wherein the positioning required number is equal to 3, when the number of the detected beacons is equal to 2, the indoor robot performs the following steps. The indoor robot receives a first distance data according to the detected beacons. The indoor robot moves the predetermined distance along a first direction and receives a second distance data according to the detected beacons. And, the indoor robot positions the location of the indoor robot according to the first distance data and the second distance data.

In the exemplary embodiment of the present disclosure, wherein the positioning required number is equal to 3, when the number of the detected beacons is equal to 1, the indoor robot performs the following steps. The indoor robot receives a first distance data according to the detected beacons. The indoor robot moves the predetermined distance along a first direction and receiving a second distance data according to the detected beacons. The indoor robot changes a movement direction of itself to move along a second direction and receives a third distance data according to the detected beacons. And, the indoor robot positions the location of itself according to the first distance data, the second distance data, and the third distance data.

In the exemplary embodiment of the present disclosure, wherein when the number of the detected beacons is more than or equal to the positioning required number, the indoor robot positions the location of the indoor robot according to the distance between the detected beacons and the indoor robot.

In the exemplary embodiment of the present disclosure, wherein when the number of the detected beacons is equal to zero, the indoor robot records a movement direction and moves along an opposite direction for leaving one specific area in order to detect the beacons.

In the exemplary embodiment of the present disclosure, wherein when the number of detected beacons is more than zero and less than the positioning required number, the indoor robot changes a movement direction to move the predetermined distance along a first direction, and the indoor robot moves to a target location after positioning the location of the indoor robot, wherein the parameter of the first direction is stored in the memory.

In the exemplary embodiment of the present disclosure, wherein the step of generating an indoor map and coordinates of the plurality of beacons comprises the following steps. The indoor robot moves along the edge of the indoor space. The indoor robot generates a closed path according to the location of a charging base station. The indoor robot displays a suggesting region on a user interface to place the beacons based on the indoor map for a user. And, the indoor robot generates the coordinates of the beacons according to the location of the placed beacons.

In the exemplary embodiment of the present disclosure, wherein detecting the beacons located within a line-of-sight area comprises the following steps. The indoor robot receives a signal transmitted by the detected beacons. The indoor robot determines an arrival time of the signal transmitted by the detected beacons. The indoor robot determines the detected beacons within the line-of-sight area according to an arrival time difference of the signal transmitted by the detected beacons. And, the indoor robot determines a distance between the detected beacons and the indoor robot within the line-of-sight area.

An exemplary embodiment of the present disclosure provides an indoor robot suitable for being configured in an indoor space for positioning and exploring. The indoor robot comprises a driving module, a memory, and a detecting module, and a processing unit. Wherein, the driving module is configured for moving the indoor robot. The memory stores a plurality of positioning modes. The detecting module is configured for detecting the beacons within a line-of-sight area and determining a number of the detected beacons within the line-of-sight area. And, the processing unit, coupled to the driving module, the memory, and the detecting module, is configured for performing one of the plurality of positioning modes according to the number of the detected beacons. Wherein when the number of the detected beacons is more than zero and less than a positioning required number, the indoor robot moves a predetermined distance according to the determined beacons for positioning the location of the indoor robot.

In the exemplary embodiment of the present disclosure, the indoor robot is a floor dust collector.

To sum up, the exemplary embodiment of the present disclosure provides the indoor robot with a plurality of position modes and the method for indoor robot positioning thereof can be used for accurately positioning and exploring according to one or two beacons. As the exemplary embodiment can receive more beacons' distance data by moving the indoor robot, the technical effect of positioning accuracy and explorations can be achieved.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Reference will now be made in detail to the exemplary embodiments of the present disclosure, examples of which are illustrated in the accompanying drawings. Wherever possible, the same reference numbers are used in the drawings and the description to refer to the same or like parts.

Figure 1:
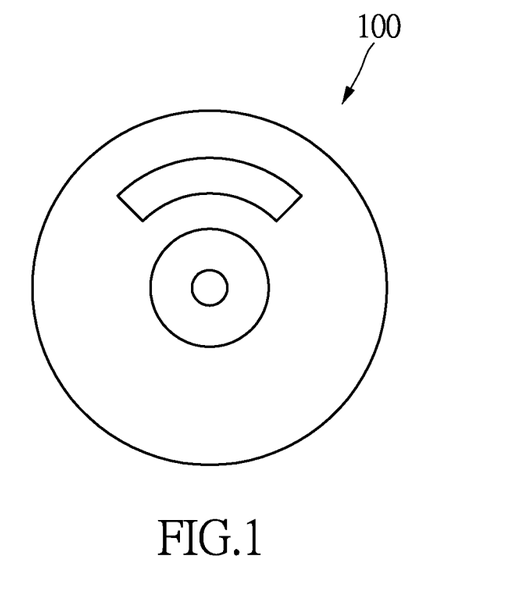
FIG. 1 is a diagram illustrating an indoor robot provided in accordance to an exemplary embodiment of the present disclosure.
Figure 2:
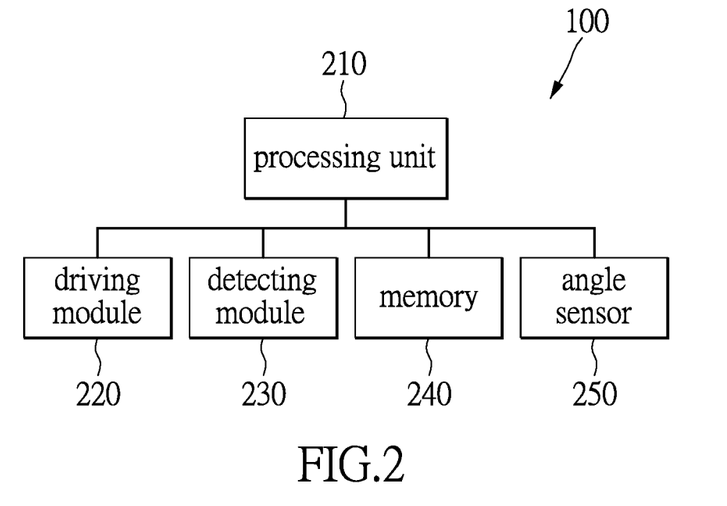
FIG. 2 is a function block diagram illustrating the indoor robot provided in accordance to an exemplary embodiment of the present disclosure.

Referring to FIG. 1 and FIG. 2, FIG. 1 is a diagram illustrating an indoor robot provided in accordance to an exemplary embodiment of the present disclosure, FIG. 2 is a function block diagram illustrating the indoor robot provided in accordance to an exemplary embodiment of the present disclosure. The indoor robot 100 comprises a processing unit 210, a driving module 220, a detecting module 230, a memory 240, and an angle sensor 250. The processing unit 210 coupled to the driving module 220, the detecting module 230, the memory 240, and the angle sensor 250 is configured for accessing data, computations, and performing the processes such as positioning, configuring parameters, and controlling drivers. The processing unit 210 may be implemented by a micro-processing controller or a micro-processor, and it is not limited thereto. The driving module 220 comprises the mechanism, such as a motor and a roller, may drive the indoor robot for movement. The memory 240 may store data such as program information and set parameters, wherein the program information includes a plurality of positioning modes that the processing unit 210 may access thereof and execute the positioning modes for positioning the location of the indoor robot 100. The angle sensor 250 is, for example, an electronic gyroscope compass, configured for sensing a movement direction and an angle of the indoor robot 100. The indoor robot 100 is, such as a floor dust collector, configured to a dust-collecting device for containing floor dust, and it is not limited.

The detecting module 230 of the indoor robot 100 may position the location of the indoor robot 100 according to the signal transmitted from a charging base station and beacons. In an exemplary embodiment of the present disclosure, according to time of arrival (ToA) of the received signals, the indoor robot 100 may determine whether the beacons transmit signals within line-of-sight (LoS) area or non-line-of-sight (NLoS) area. The indoor robot 100 may perform variable positioning modes based on the number of the detected beacons within line-of-sight area for positioning the location of the indoor robot 100, particularly, when the number of the detected beacons is less than a positioning required number (such as 3), the indoor robot 100 may switch among the positioning modes and receive the coordinate itself to move toward a target location. When the number of the detected beacons is not enough to position the location of the indoor robot 100, the indoor robot 100 may compute the coordinates of the detected beacons and the coordinates of the current position of the indoor robot 100 by the distance data received before and after the indoor robot 100 moves.

Figure 3:
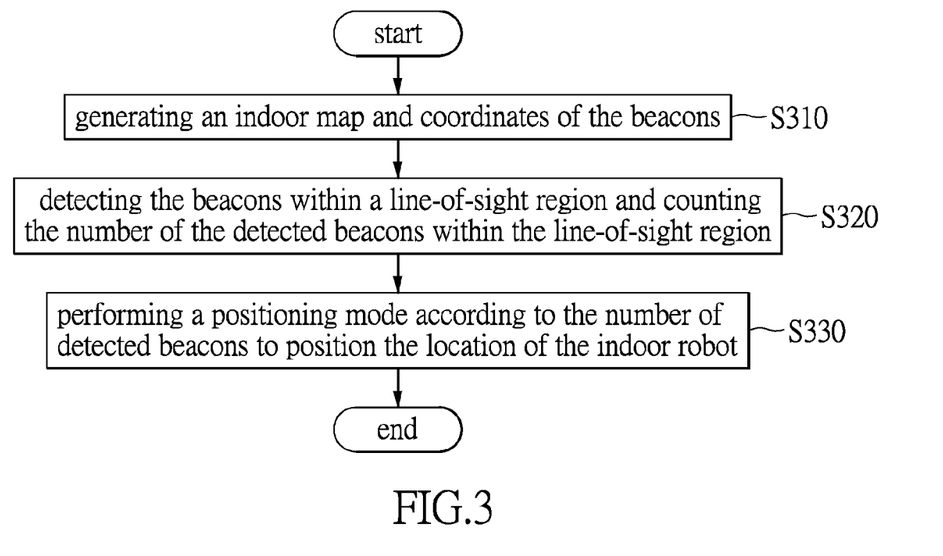
FIG. 3 is a flowchart illustrating a method for positioning the indoor robot provided in accordance to another exemplary embodiment of the present disclosure.
Figure 4:
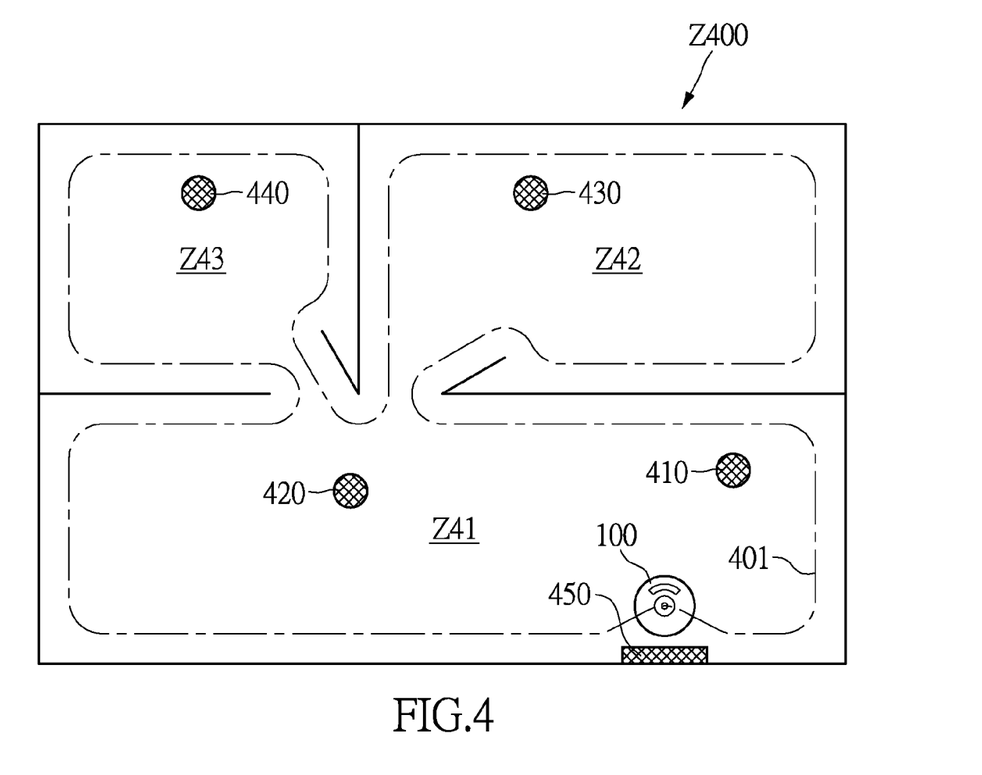
FIG. 4 is a diagram illustrating the indoor robot configured in an indoor space provided in accordance to an exemplary embodiment of the present disclosure.

Referring to FIG. 3 and FIG. 4, FIG. 3 is a flowchart illustrating a method for positioning the indoor robot provided in accordance to another exemplary embodiment of the present disclosure. FIG. 4 is a diagram illustrating the indoor robot configured in an indoor space provided in accordance to an exemplary embodiment of the present disclosure. In FIG. 3, first, in step S310, the indoor robot 100 generates an indoor map and the coordinates of the beacons 410, 420, 430, and the charging base station 450. The charging base station 450 also may be used as the beacon for positioning, and the charging base station 450 has the similar positioning function as the beacons 410, 420, and 430. The indoor robot 100 may move along the side on the wall in an indoor space Z400 to form a traveled path 410. After generating a closed path from the traveled path 410, an indoor map corresponding to the indoor space Z400 can be generated. The plurality of beacons 410, 420, 430 can be configured in the indoor space Z400 and settled in respective space Z41, Z42, Z43 by users for the indoor robot 100 positioning.

In step S320, the indoor robot 100 may detect the beacons within the line-of-sight area (such as beacons 410, 420) and counting the number of the detected beacons within the line-of-sight area. The indoor robot 100 may transmit/receive signals to/from each detected beacons 410, 420, 430, 440 and determine which detected beacon(s) is(are) present within the line-of-sight area of the indoor robot 100. The line-of-sight area represents that the signal transmitted between the indoor robot 100 and the detected beacons is a straight line and the signal is not sheltered by any obstacles. Taking FIG. 4 as an example, the charging base station 450 and the detected beacons 410, 420 are located within the line-of-sight area of the indoor robot 100, while the beacons 430, 440 are within non-line-of-sight area because the signals transmitted from the beacons 430, 440 are sheltered by the wall. The indoor robot 100 may respectively detect the distance between the detected beacons 410, 420 and the indoor robot 100 within the line-of-sight area, and compute the coordinates of the indoor robot 100 by the detected distance data and the coordinates of the detected beacons.

In step S320 for detecting the beacons within the line-of-sight area, the indoor robot 100 may receive the signal transmitted from the detected beacons, and then compute time of arrival of the signal transmitted from the detected beacons. According to the variation of time of arrival of the signal transmitted from the detected beacons, the indoor robot 100 determines the detected beacons which are located within the line-of-sight area and counts the number of the detected beacons. After detecting the beacons within the line-of-sight area, the indoor robot 100 may compute each distance between the detected beacons within the line-of-sight area and the indoor robot 100. The indoor robot 100 may determine the distance between the detected beacons and the indoor robot 100 according to the signal character such as the variance of time of arrival and the amplitude. In the exemplary example, the indoor robot 100 may determine the distance between the detected beacons and the indoor robot 100 by using the UWB (ultra wide band) point-to-point measurement technology, and it is not limited thereto.

In step S330, the indoor robot 100 may perform one of a plurality of positioning modes according to the number of the detected beacons for positioning the location of indoor robot 100. In general, as long as the number of detected beacons located within the line-of-sight area is more than or equal to the positioning required number (such as 3), the indoor robot 100 can directly compute the coordinates of the indoor robot 100 itself according to the received distance data and the coordinates of the detected beacons. However, when the number of the detected beacons is less than the positioning required number (such as 3), the indoor robot 100 can compute the coordinates of itself not directly, but rather according to different positioning modes. In the exemplary example, take the positioning required number which is equal to 3 as the example for the following illustration.

In the exemplary example, the indoor robot 100 has a plurality of positioning modes, and the positioning modes comprise the positioning mode with no beacon detected, the positioning mode with one beacon detected, and the positioning mode with multiple beacons detected. The processing unit 210 can perform one of the positioning modes according to the number of the detected beacons. In one of the positioning modes, when the number of the detected beacons is more than zero and less than 3, the indoor robot 100 moves a predetermined distance along a movement direction according to the detected beacons for positioning the location of the indoor robot 100. The distance between the indoor robot 100 and the detected beacons will be changed because of the movement of the indoor robot 100. The indoor robot 100 can determine the related position between the detected beacons and the indoor robot 100 to confirm the related location according to both the distance data and the movement direction received before and after the indoor robot moves, and then the location of the indoor robot 100 may be positioned according to the coordinates of the detected beacons. In other words, the indoor robot 100 can be re-positioned by the predetermined movement when the number of beacons used for positioning detected by the indoor robot 100 is not enough (such as 1 or 2 beacons detected) to perform the positioning modes with multiple beacons.

Figure 5:
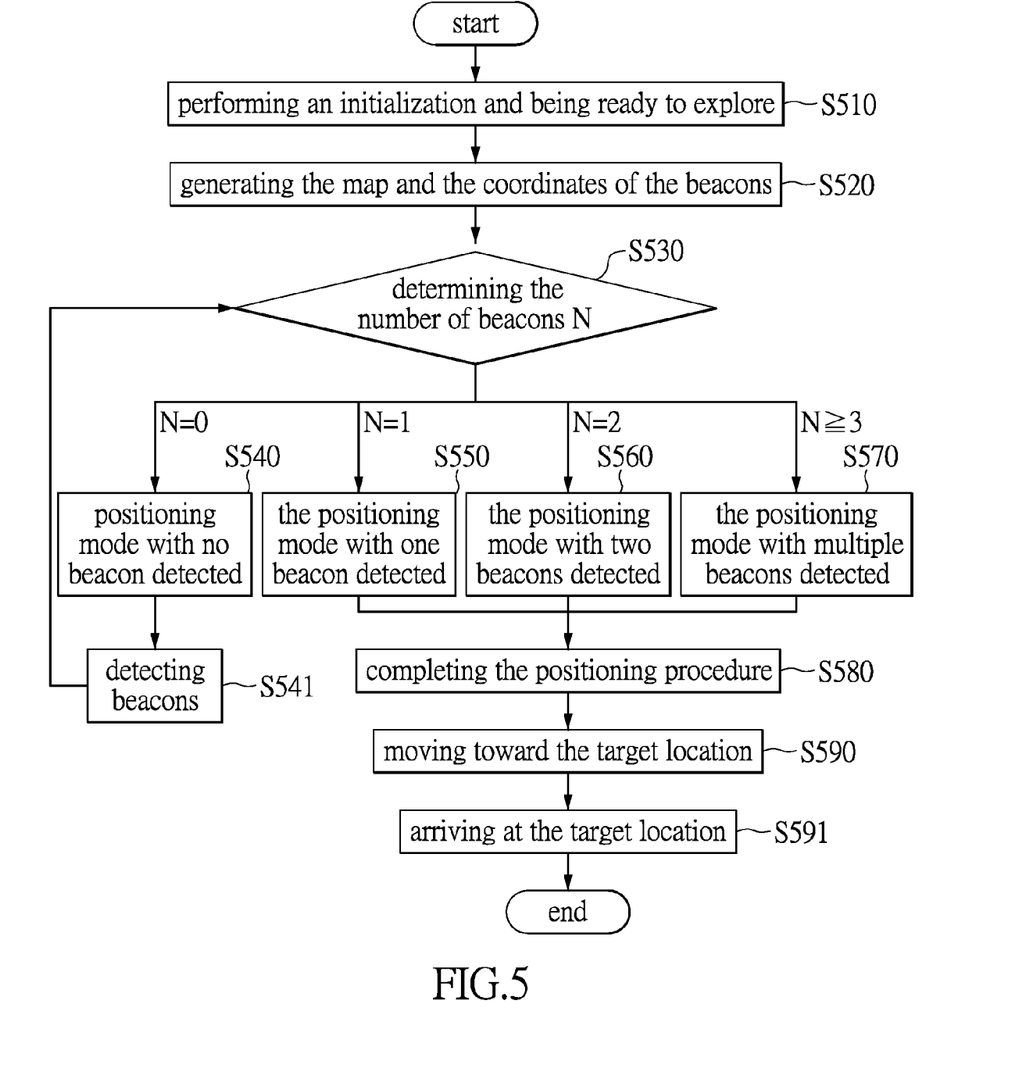
FIG. 5 is a flowchart illustrating a method for positioning the indoor robot provided in accordance to an exemplary embodiment of the present disclosure.

In the following illustration, the method for indoor robot positioning is provided. Referring to FIG. 5, FIG. 5 is a flowchart illustrating a method for positioning the indoor robot provided in accordance to an exemplary embodiment of the present disclosure. In step S510, the indoor robot 100 is initialized and ready for exploration. In step S520, the indoor robot 100 generates the indoor map Z400 and the coordinates of the beacons 410, 420, 430, 440. The charging base station 450 can be used as the origin at the indoor map, but it is not limited thereto.

Figure 6:
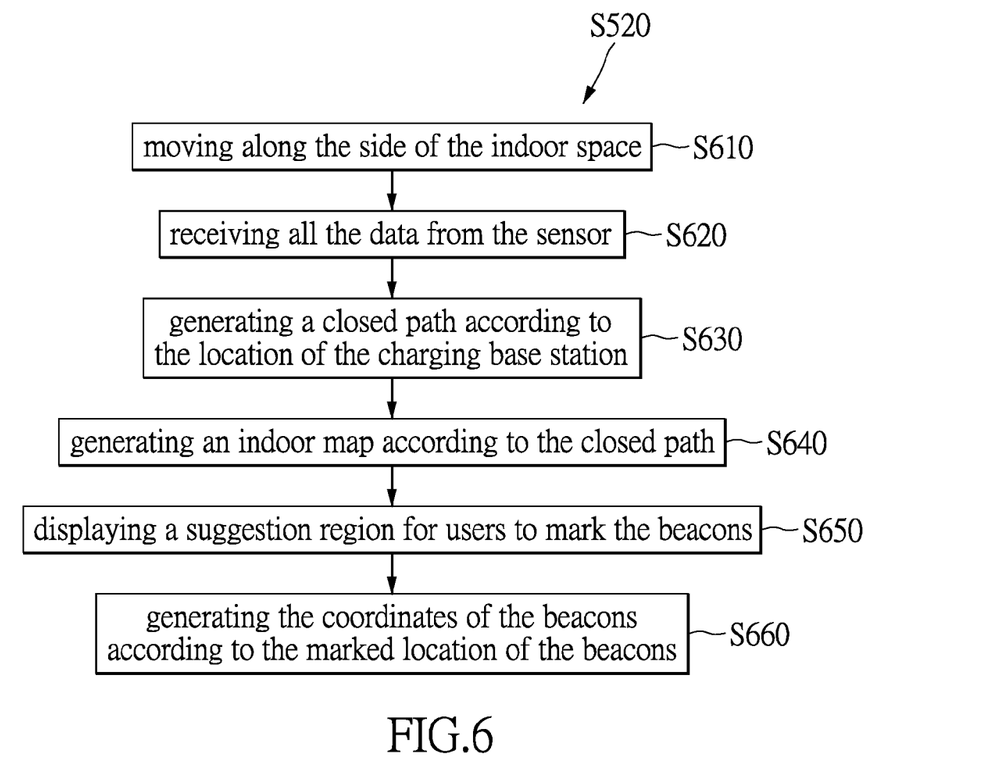
FIG. 6 is a flowchart illustrating a method for generating an indoor map provided in accordance to an exemplary embodiment of the present disclosure.

Referring to FIG. 5 and FIG. 6, the method for generating the indoor map is provided. FIG. 6 is a flowchart illustrating a method for generating an indoor map provided in accordance to an exemplary embodiment of the present disclosure. In step S610, the indoor robot 100 moves along the side of the indoor space, such as the wall of the indoor space. In step S620, the indoor robot 100 retrieves all the data from sensors. The indoor robot 100 determines the location of the wall or obstacles by the build-in distance sensors (such as the ultrasonic sensor, the infrared sensors, the collision sensor, etc.), and records the traveled path. Then, in step S630, the indoor robot 100 generates a closed path according to the location of the charging base station 450. In the process at generating the indoor map, the indoor robot 100 determines whether the traveled path forms the closed path or not (such as the path 410). If the traveled path forms a closed path, the process of generating the indoor map is completed. If the traveled path does not forms a closed path, the indoor robot 100 continually moves to form the closed path. Then, in step S640, the indoor robot 100 generates the indoor map according to the closed path. In step S650, after generating the indoor map, the indoor robot 100 shows a suggesting region on a user interface, such as a monitor or a computer, for users to mark the beacons 410-440. In step S660, the beacons may be configured in the indoor space by the user according to the suggesting region, and the indoor robot 100 generates the coordinates of the beacons based on the marked location of the configured beacons.

Besides, if the beacons are marked in the indoor space by the user, the indoor robot 100 determines all the coordinates of the beacons while generating the indoor map, wherein the coordinate of the charging base station 450 can be used as the referenced origin point to generate the coordinates of the beacons, and it is not limited thereto. If there is no need to mark the beacons by the user, the indoor robot 100 can directly generate the indoor map without performing step S650 and S660.

Referring FIG. 5, in step S530, the indoor robot 100 determines the number of beacons for positioning, N, where N is zero or any positive integer. The indoor robot 100 detects the signal from beacons 410-440 and the charging base station 450, and determines which beacons are located within the line-of-sight area. The beacons located within the line-of-sight area can be used for indoor robot positioning. When N is equal to 0, it represents that there is no detected beacons for positioning, and the indoor robot 100 performs the positioning mode with no beacon detected (in step S540).

Figure 7:
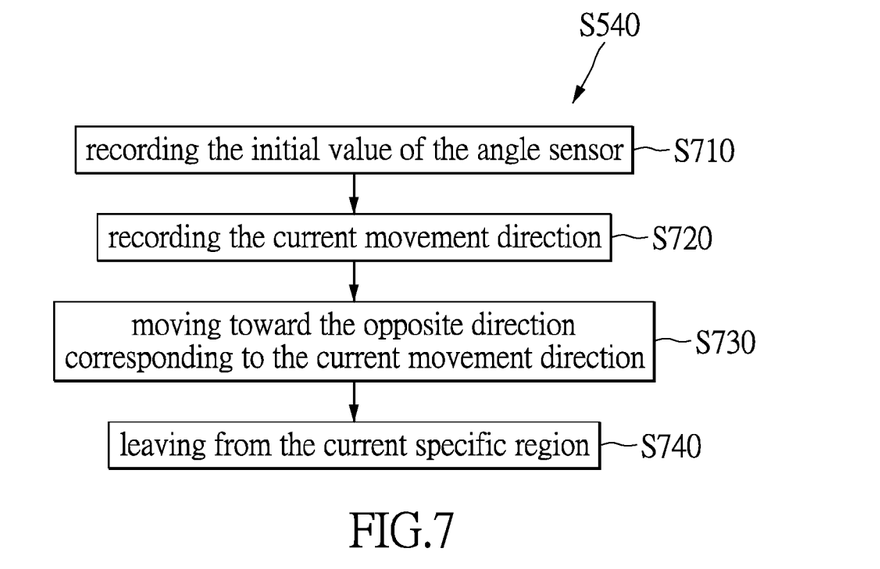
FIG. 7 is a flowchart illustrating a method for positioning the indoor robot by the positioning mode with no beacon detected provided in accordance to an exemplary embodiment of the present disclosure.

The method for positioning the indoor robot by the positioning mode with no beacon detected is provided in FIG. 5 and FIG. 7. FIG. 7 is a flowchart illustrating a method for positioning the indoor robot by the positioning mode with no beacon detected provided in accordance to an exemplary embodiment of the present disclosure. In step S710, the indoor robot 100 records the initial value outputted by the angle sensor 250, and then records the current movement direction (in step S720). Then, in step S730, the indoor robot 100 moves at an opposite direction corresponding to the current movement direction to leave the current specific region.

During the process for the indoor robot 100 exploration, if some detected beacons suddenly disappear, it may represent that the indoor robot 100 moves into the specific region, such as the room or the shelters. At this time, the indoor robot 100 leaves from the current specific region to search for the beacons by using the positioning mode with no beacon detected (in step S541) until there are one or more beacons detected to re-position the indoor robot 100. After detecting one or more beacons used for the indoor robot positioning, the process returns to step S530, for determining the number of the detected beacons, and one positioning mode is selected according to the number of the detected beacons. In other words, the indoor robot 100 records the traveled path, and when there is no beacons detected in the positioning process, the indoor robot 100 leaves from the current specific region along the recorded traveled path in order to re-position the indoor robot 100 for moving toward the target location.

Figure 8A:
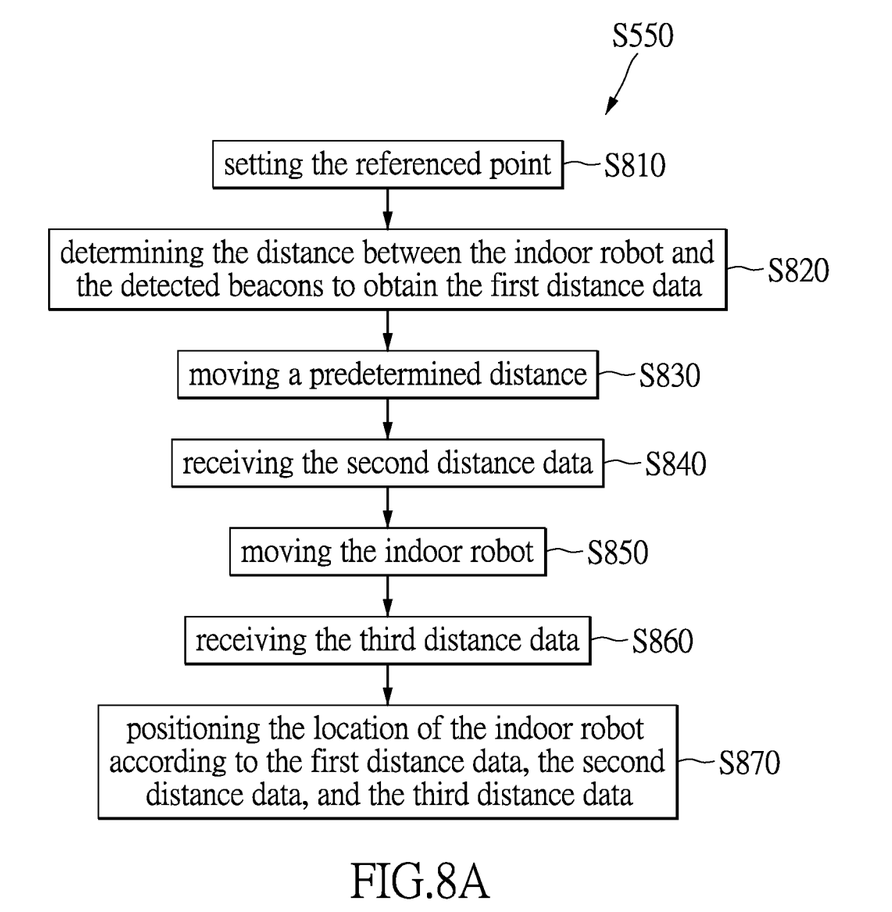
FIG. 8A is a flowchart illustrating a method for positioning the indoor robot by the positioning mode with one beacon detected provided in accordance to an exemplary embodiment of the present disclosure.
Figure 8B:
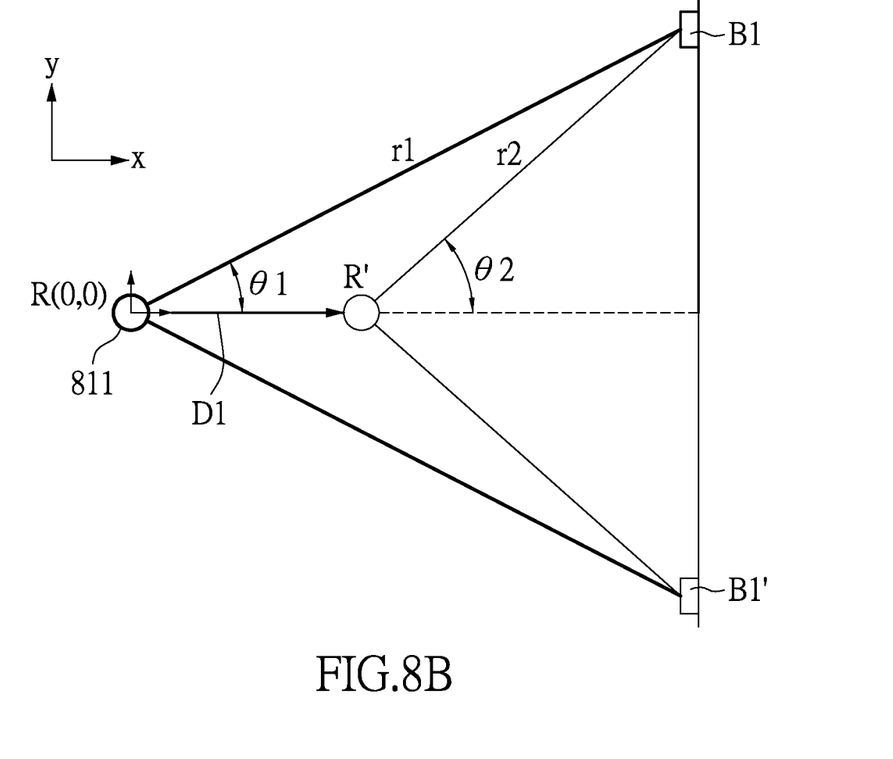
FIGS. 8B-8C are the diagrams illustrating a method for positioning the indoor robot by the positioning mode with one beacon detected provided in accordance to an exemplary embodiment of the present disclosure.
Figure 8C:
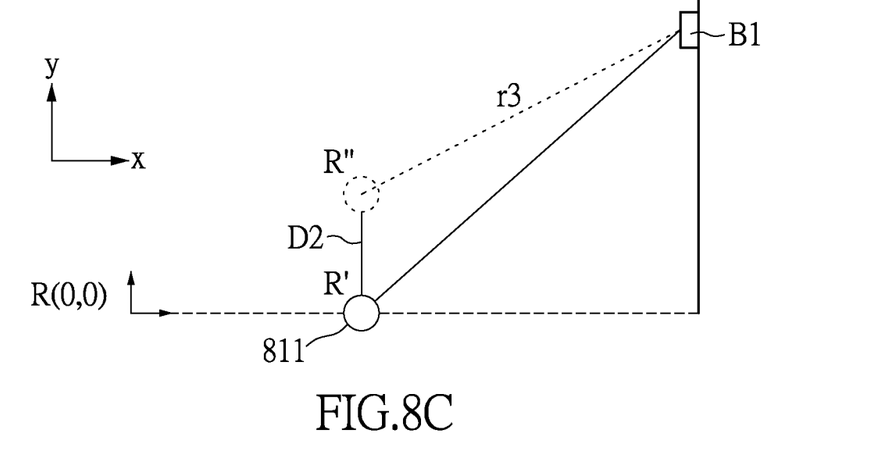

When N is equal to 1, the indoor robot 100 performs the positioning mode with one beacon detected (in step S550). Referring to FIG. 5 and FIG. 8A-FIG. 8C, the method for the positioning mode with one beacon detected is provided. FIG. 8A is a flowchart illustrating a method for positioning the indoor robot by the positioning mode with one beacon detected provided in accordance to an exemplary embodiment of the present disclosure. FIGS. 8B-8C are the diagrams illustrating a method for positioning the indoor robot by the positioning mode with one beacon detected provided in accordance to an exemplary embodiment of the present disclosure. In FIG. 8A-FIG. 8C, the symbol 811 represents the indoor robot. First, in step S810, the indoor robot 811 sets the current position to the referenced origin point R. Then in step S820, the indoor robot 811 receives a first distance data by determining the distance r1 between the indoor robot 811 and the detected beacon B1. Next, the indoor robot 811 moves to the location R' by moving the predetermined distance D1 along a first direction (such as X-direction) (in step S830). Then, the indoor robot 811 receives a second distance data by determining the distance r2 between the indoor robot 811 and the detected beacon B1 (in step S840). Then in step S850, the indoor robot 811 moves the predetermined distance D2 to the location R" along a second direction (such as Y-direction), and receives a third distance data by determining the distance r3 between the indoor robot 811 and the detected beacon B1 (in step S860). Then in step S870, the indoor robot 811 positions the location of the indoor robot 811 according to the first distance data, the second distance data, the third distance data, and the coordinate of the detected beacon B1.

Wherein, the parameter value of the first direction and the second direction can be stored in the memory 240 of the indoor robot 811, or in a program or firmware for the indoor robot 811. The first direction and the second direction can be two perpendicular directions with each other, such as X-direction and Y-direction, or just two random directions. However, in the present exemplary, the X-direction and Y-direction are used for simplifying the computation process and reducing the time at the indoor robot positioning.

In FIG. 8B, the indoor robot 811 moves toward the right side (that is, moves along the X-direction) at first time, which reducing the distance between the indoor robot 811 and the detected beacon B1 (that is, r2 is less than r1). The situation represents that the detected beacon B1 is located at the right side of the indoor robot 811, where there may be two possible locations of the detected beacon B1 (that is, detected beacon B1 or B1'). To figure out the specific location of the detected beacon B1 or B1', the process continues by creating a first reference circle with a centre point which is the referenced origin point R(0,0) and a radius r1, and by creating a second reference circle with a centre point which is the location R' and a radius r2. Hence, two intersection points of the first reference circle and the second reference circle are the location of the detected beacons B1 and B1'. Therefore, the possible location of the detected beacon B1 is restricted by the first movement of the indoor robot 811 from the circle path to the two points.

Hence, the indoor robot 811 moves upwards (that is, moves along the Y-direction) for the second movement, and the result reveals that the distance between the indoor robot 811 and the detected beacon B1 is less than before (that is, r3 is less than r2). In this situation, the actual detected beacon B1 is located above the indoor robot 811, hence the possible location of the detected beacon B1' is excluded. Therefore, the each coordinate of the detected beacon B1 and B1' corresponding to the referenced origin point R(0,0) can be computed according to the referenced origin point R(0,0) and the distance r1 and r2. Next, after confirming the location of the detected beacon B1, the indoor robot 811 may compute the coordinate of the current location R″ of the indoor robot 811 by using the pre-stored coordinate of the detected beacon B1 and the coordinate of the detected beacon B1 corresponding to the referenced origin point R(0,0), in order to position the location of the indoor robot 811, as shown in FIG. 8C.

In FIG. 8B and FIG. 8C, the referenced axis X and Y can be determined by the direction detected by the angle sensor 250 of the indoor robot 811, hence the referenced origin point R(0,0), the movement vector and the movement angle of the indoor robot 811 can be defined. On the other hand, in the exemplary embodiment, the indoor robot 811 can be positioned by using the trigonometric function to compute the angles θ1 and θ2 with the distance r1, r2 and the predetermined distance D1.

FIG. 8B and FIG. 8C illustrate the exemplary embodiment that the detected beacon B1 is located on the top-right side of the indoor robot 811 (that is, in the first quadrant). Similarly, in the case that the distance between the indoor robot 811 and the detected beacon B1 is larger than before (that is, the distance r2 is larger than the distance r1) after the indoor robot 811 moves along the X-direction, the situation represents that the location of the detected beacon B1 is on the left side of the indoor robot 811 which there may be two possible locations: on the top-left side or on the bottom-left side of the indoor robot 811. Hence, the indoor robot 811 can detect the actual location of the detected beacon B1 in order to compute the coordinate of the indoor robot 811 by the distance change in the second movement. As illustrated above, those skilled in the art would be able to realize the method for indoor robot positioning in the case that the detected beacon B1 is on the bottom side of the indoor robot 811, therefore it should be not necessary to go into details.

Figure 9A:
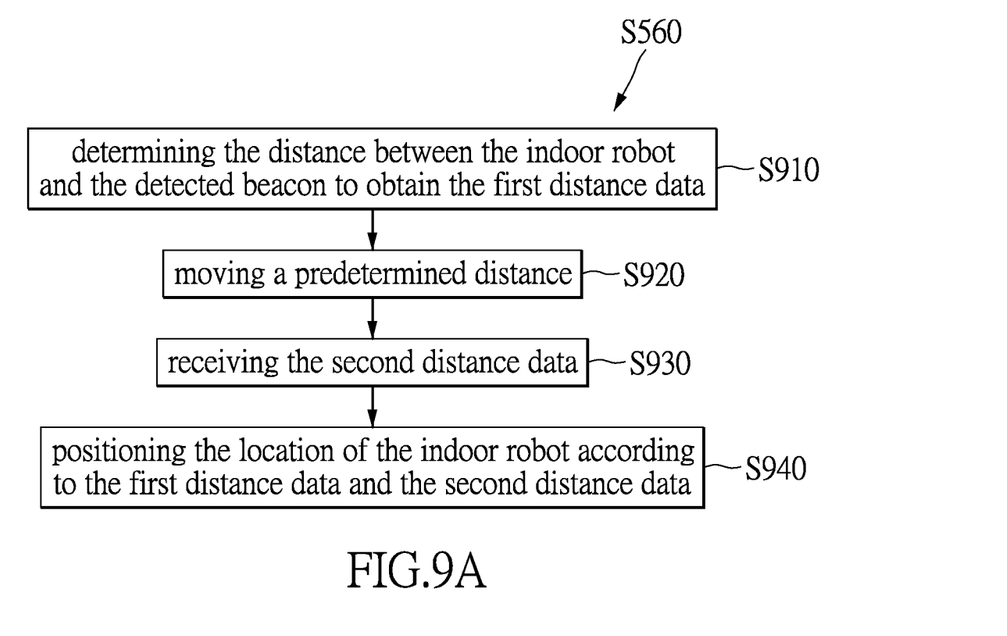
FIG. 9A is the flowchart illustrating a method for positioning the indoor robot by the positioning mode with two beacons detected provided in accordance to an exemplary embodiment of the present disclosure.
Figure 9B:
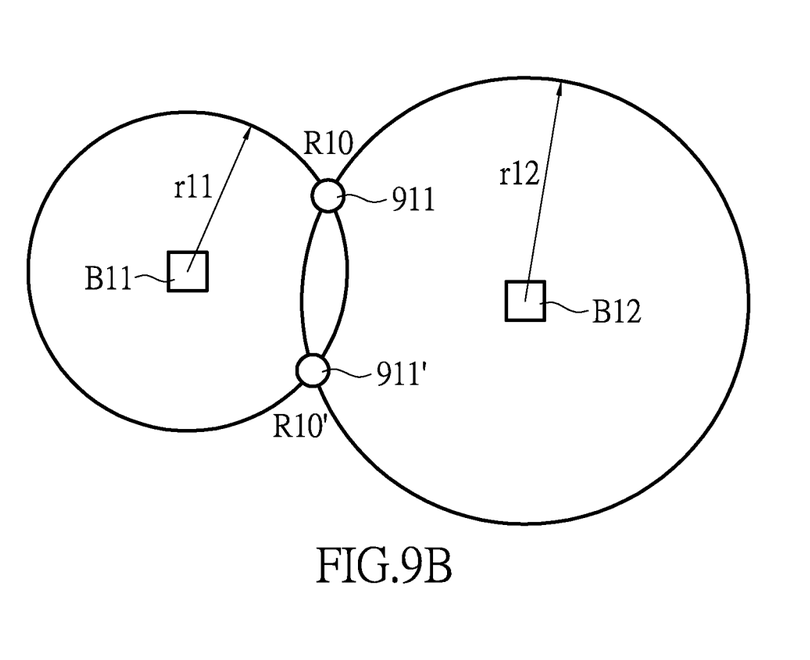
FIGS. 9B-9D are diagrams illustrating a method for positioning the indoor robot by the positioning mode with two beacons detected provided in accordance to an exemplary embodiment of the present disclosure.
Figure 9C:
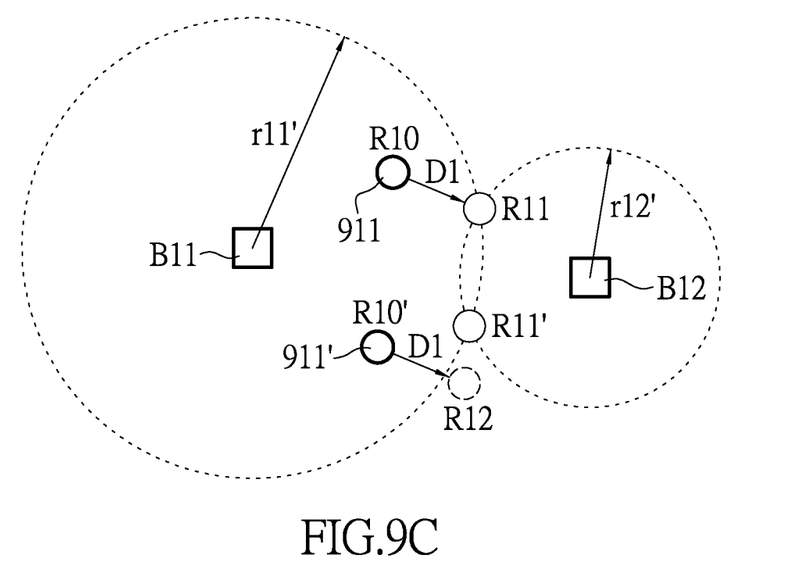
Figure 9D:
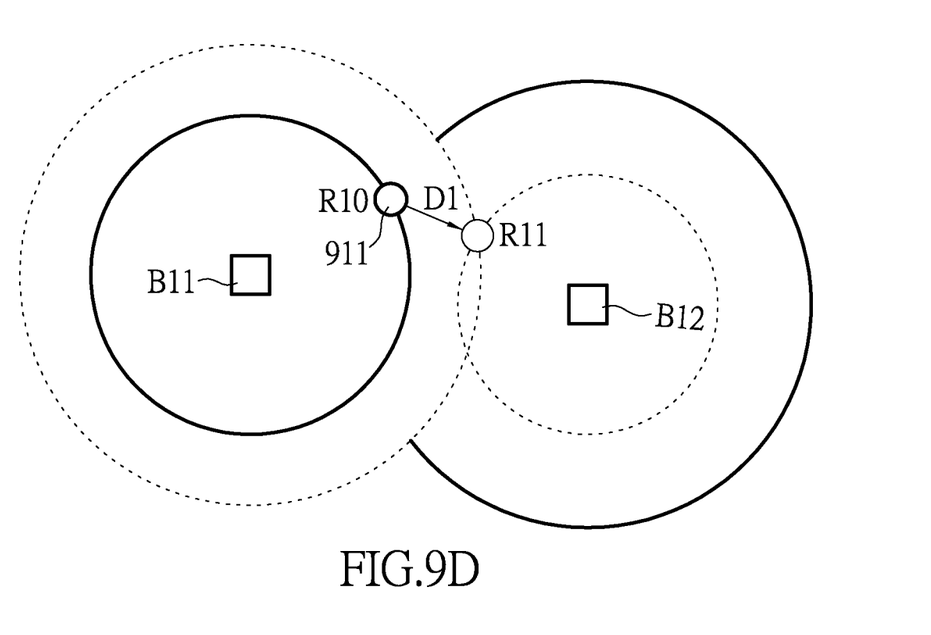

Referring to FIG. 5, when N is equal to 2, the indoor robot 100 performs the positioning mode with two beacons detected (in the step S560). Referring to FIG. 5 and FIG. 9A-FIG. 9D, the method for indoor robot positioning with the positioning mode with two beacons detected is provided. FIG. 9A is the flowchart illustrating a method for positioning the indoor robot by the positioning mode with two beacons detected provided in accordance to an exemplary embodiment of the present disclosure. FIGS. 9B-9D are diagrams illustrating a method for positioning the indoor robot by the positioning mode with two beacons detected provided in accordance to an exemplary embodiment of the present disclosure. In FIG. 9A-FIG. 9D, the symbol 911 represents the location of the indoor robot, and the symbol 911' represents another possible location of the indoor robot before the indoor robot positions the location itself. Referring to FIG. 9A, first in step S910, the distance r1 and r2 (the first distance data) between the indoor robot 911 and the detected beacons B11 and B12 are respectively determined, wherein the detected beacons B11 and B12 are the beacons currently detected within the line-of-sight area. There are two possible locations of the indoor robot 911, represented as the location R10 and R10', that can be inferred from the detected beacons B11 and B12 and the distance r11 and r12. The coordinates of the location R10 and R10' can be retrieved by computing the intersection of two reference circles which centre points are the detected beacons B11, B12 and the radii are the distance r11, r12 respectively.

Then, in step S920, the indoor robot 911 moves the predetermined distance D1 along the first direction, wherein the first direction can be configured by the indoor robot 911 as shown in FIG. 9C, and it is not limited thereto. The indoor robot 911 moves from the detected location R10, R10' to location R11, R11'. Then, in step S930, the distance r11' and r12' (the second distance data) between the indoor robot 911 and the detected beacons B11, B12 are determined respectively according to the signals of the detected beacons B11, B12 by the indoor robot 911. Then, in step S940, the location of the indoor robot 911 can be determined according to the first distance data and the second distance data, wherein the original coordinate of the indoor robot 911 is the location R10 and the coordinate after the indoor robot 911 moves is the location R11, as shown in FIG. 9D.

In step S940, the possible location R10, R10' before the indoor robot 911 moves can be determined by computing the intersection of two reference circles which centre points are the detected beacons B11, B12 and the radii are the distance r11, r12 respectively, and the movement direction of the indoor robot 911 can be determined by the build-in angle sensor 250. The possible location R11, R11' after the indoor robot 911 moves can be determined by computing the intersection of two reference circles which centre points are the detected beacons B11, B12 and the radii are the distance r11', r12' respectively. And, the indoor robot 911 can determine the location R11, R12 after moving by the movement direction and the movement distance D1 between the location R11 and R12. As shown in FIG. 9C, because the location R11 satisfies the computing result, the location R11 is the location after the indoor robot 911 moves. Hence, the process for indoor robot 911 positioning is completed.

In one other exemplary example, the original coordinate of the indoor robot 911 is the location R10, and the location after the indoor robot 911 moves is the location R11, and the distance between the indoor robot 911 and the detected beacons B11 and B12 are the distance r11, r12' respectively, as shown in FIG. 9C. On the contrary, the original coordinate of the indoor robot 911 is the location R10', and the location after the indoor robot 911 moves will not be the location R11 or R11', and the distance between the indoor robot 911 and the detected beacons B11 and B12 after the indoor robot 911 moves will be the distance between the location R12 and the detected beacons B11, B12 respectively instead of distance r11', r12'.

That is to say, in the positioning mode with two beacons detected, after detecting two beacons B11, B12, the indoor robot 911 determines the distance between the detected beacons B11 and B12 respectively, and then moves the predetermined distance D1 along the predetermined direction for positioning the indoor robot 911.

Figure 10:
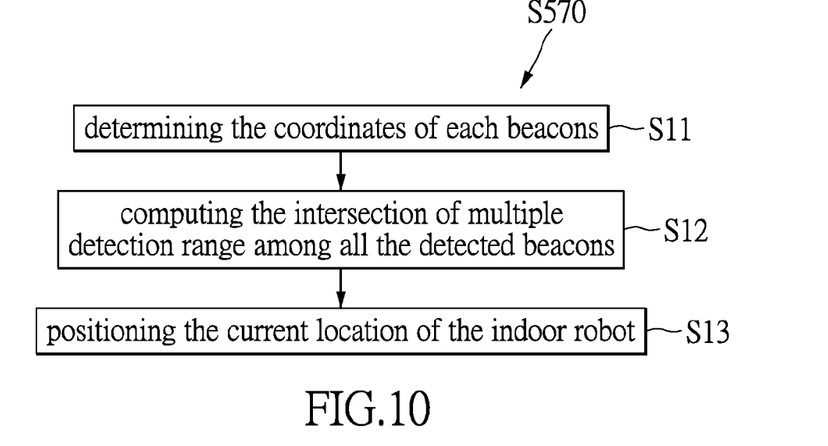
FIG. 10 is a flowchart illustrating a method for positioning the indoor robot by the positioning mode with multiple beacons detected provided in accordance to an exemplary embodiment of the present disclosure.

Referring to FIG. 5, when N is equal to or more than 3, the indoor robot 100 performs the positioning mode with multiple beacons detected (in step S570). The method of the positioning mode with multiple beacons detected is provided in FIG. 5 and FIG. 10. FIG. 10 is a flowchart illustrating a method for positioning the indoor robot by the positioning mode with multiple beacons detected provided in accordance to an exemplary embodiment of the present disclosure. In step S11, the indoor robot 100 determines the coordinate of each detected beacons and the distance between the indoor robot 911 and each detected beacons, and then computing the intersection points of the detection range of each detected beacons (in step S12). In step S12, the indoor robot 100 may compute the intersection of multiple referenced circles which the centre point is the location of each detected beacon and the radius is the distance between the indoor robot 100 and each detected beacon. Then in step S13, the indoor robot 100 determines the location of the indoor robot 100 according to the intersection of the referenced circles. The intersection of the multiple referenced circles is the location of the indoor robot 100. The positioning means is, for example, triangulation, and those skilled in the art would realize the detailed content according to the illustration above, therefore it should be not necessary to go into details. Further, when the number of detected beacons is more than 3, the indoor robot 100 may select the beacons with better signal strength for positioning, therefore the performance effect of accuracy and speed at positioning is increased.

After performing one of the positioning modes according to the number of the detected beacons N and completing the positioning procedure, the indoor robot 100 obtains the coordinate of itself (in step S580). In the next step, the indoor robot 100 moves toward the determined target location (in step S590), and then arrives at the target location (in step S591).

It should be noted that the indoor robot 100 can switch the positioning mode according to the number of the detected beacons N during moving at any time point for preventing losing the coordinate of itself. Even though the number of the detected beacons N is less than the positioning required number (in general, 3), the indoor robot 100 can be positioned by moving, and arrives at the target location accurately. The movement direction for indoor robot positioning can be pre-stored in the memory 240 to reduce the computation time, which the movement direction can be designed in practice and determined by the angle sensor 250, such as the north direction or the east direction, and it is not limited thereto. Therefore, as the movement direction is stored in the memory 240 and the indoor robot 100 performs the positioning mode with one or two beacons detected, the indoor robot 100 can move along the pre-designed direction to reduce the computation time. On the other hand, during the movement, the indoor robot 100 can dynamically adjust the movement direction based on the location of the shelters. The indoor robot 100 can record the traveled path, and compute the related position and coordinates after moving.

Figure 11:
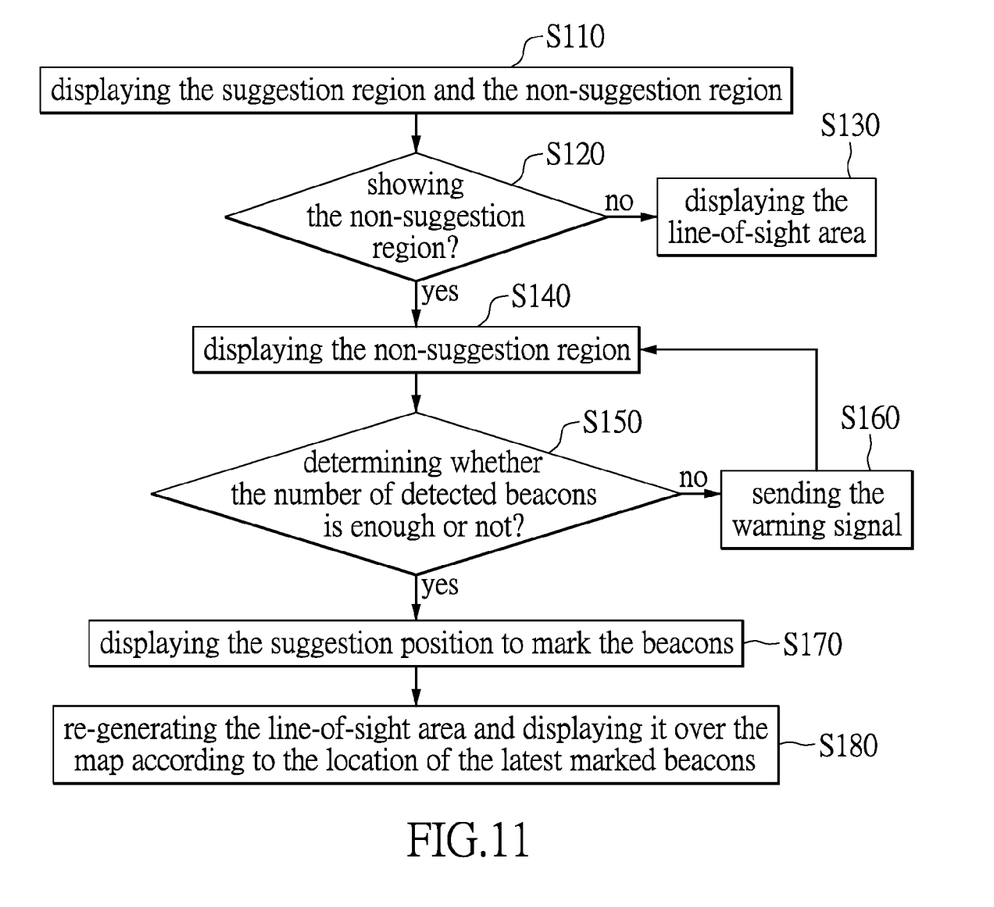
FIG. 11 is a flowchart illustrating a method for configuring the beacons provided in accordance to an exemplary embodiment of the present disclosure.

In the exemplary embodiment, after generating the indoor map, the indoor robot shows the beacon configuration suggestion on the computer and the screen for users, and the steps are shown in FIG. 11. FIG. 11 is a flowchart illustrating a method for configuring the beacons provided in accordance to an exemplary embodiment of the present disclosure. First, in step S110, the indoor robot 100 shows the suggestion region and non-suggestion region on the user interface (the screen), which the two kinds of regions can be identified with different colors, for example, the red and the blue. The suggestion region and the non-suggestion region can be defined by the location of the beacons which is within the line-of-sight area or the non-line-of-sight area, and the region of the line-of-sight area may vary with the configuring position of the beacons. Then, the step comprises to determine whether the process for showing the non-suggestion region is called or not by the user (in step S120). When the process for showing the non-suggestion region is called by the user (in step S140), it is determined whether the number of the detected beacons is enough or not (in step S150). When the process for showing the suggestion region is called by the user, the line-of-sight area is displayed (in step S130).

In the case of selecting the non-suggestion region, if the number of the detected beacons is enough, the suggestion location for marking the beacon is displayed (in step S170). If the number of the detected beacons is not enough, a warning signal is transmitted (in step 160). When the number of the detected beacons is enough, the suggestion location for marking the beacon is displayed (in step S170), and then the line-of-sight area is re-generated and shown over the map according to the location of the latest marked beacons (in step S180).

As shown in FIG. 11, the indoor robot 100 has the function for suggesting the location to mark the beacons and simulating the line-of-sight area, so that the configuring location for beacons and the moving area for the indoor robot 100 can be pre-determined by users.

It should be noted that the indoor robot and the method for indoor robot positioning can be configured not only to the indoor space but also to the outdoor space or some specific area. When the indoor robot and the method for indoor robot positioning are applied at the outdoor space or the specific area, the indoor robot also may switch the positioning modes according to the number of detected beacons to position the location of the indoor robot. As the exemplary example takes the indoor robot as an example, the positioning method also may applied at an outdoor robot or the robot and a unit with moving and positioning function, and it is not limited thereto.

In summary, the indoor robot and the method for indoor robot positioning disclosed in the present disclosure comprises a plurality of positioning modes and can be adapted to perform positioning according to the number of the detected beacons. During the indoor robot moving, the indoor robot does not lose its direction which may result from the loss of signals from part of the beacons because the indoor robot can re-position itself to keep exploring by moving its location.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A method for indoor robot positioning, the indoor robot adapted in an indoor space and a plurality of beacons adapted in the indoor space, the method for indoor robot positioning comprising:

generating, by a processor in the indoor robot, an indoor map and coordinates information of the plurality of beacons, storing the indoor map and the coordinates information of the plurality of beacons in a memory of the indoor robot;

detecting, by a detecting unit, the beacons located within a line-of-sight area and counting the number of the detected line-of-sight beacons within the line-of-sight area; and performing one of a plurality of positioning modes according to the number of the detected beacons by the indoor robot;

wherein when the number of the detected beacons is equal to 2, the steps performed by the indoor robot comprise:

obtaining a first distance data between the indoor robot at a first position and a first detected beacon of the two detected beacons, and obtaining a first distance data between the indoor robot at the first position and a second detected beacon of the two detected beacons;

determining two intersection points between a first circle and a second circle, the indoor robot at the first position being located at one of two intersection points, wherein the first circle is centered at the first detected beacon with a radius equal to the first distance data between the indoor robot and the first detected beacon, and the second circle is centered at the second detected beacon with a radius equal to the first distance data between the indoor robot and the second detected beacon, the two intersection points including a first intersection point and a second intersection point;

obtaining a position data of a first intersection point and a position data of the second intersection point;

driving the indoor robot, by a driving unit, to move a predetermined distance along a first direction to a second position;

obtaining a second distance data between the indoor robot at the second position and the first detected beacon, and obtaining a second distance data between the indoor robot at the second position and the second detected beacon;

determining two intersection points between a new first circle and a new second circle, the indoor robot at the second position being located at one of two intersection points, wherein the new first circle is centered at the first detected beacon with a radius equal to the second distance data between the indoor robot at the second position and the first detected beacon, and the new second circle is centered at the second detected beacon with a radius equal to the second distance data between the indoor robot at the second position and the second detected beacon, obtaining position data of the two intersection points;

calculating and obtaining a first position data of the indoor robot assuming that the indoor robot at the first position is located at the first intersection point and is moved the predetermined distance along the first direction to the second position;

calculating and obtaining a second position data of the indoor robot assuming that the indoor robot at the first position is located at the second intersection point and is moved the predetermined distance along the first direction to the second position;

comparing the first position data and the second position data of the indoor robot to the position data of the two intersection points between the new first circle and the new second circle when the indoor robot is at the second position, either the first position data or the second position data should match the position data of one of the two intersection points, and either the first position data or the second position data that matches the position data of one of the two intersection points is the position data of the indoor robot at the second position;

recording the position data of the indoor robot at the second position in the memory device of the indoor robot.

2. The method for indoor robot positioning according to claim 1, wherein when the number of the detected beacons is more than or equal to a positioning required number, the indoor robot positions the location of the indoor robot according to the distance between the detected beacons and the indoor robot.

3. The method for indoor robot positioning according to claim 1, wherein when the number of the detected beacons is equal to zero, the indoor robot records a movement direction and moves toward the opposite direction corresponding to the movement direction, for leaving from one specific area of the current present area in order to detect the beacons.

4. The method for indoor robot positioning according to claim 1, wherein the parameter of the first direction is stored in the memory of the indoor robot.

5. The method for indoor robot positioning according to claim 1, wherein the step of generating an indoor map and coordinates information of the plurality of beacons comprises:

moving along edge of the indoor space;

generating a closed path according to the location of a charging base station;

generating the indoor map according to the closed path;

according to the indoor map, displaying a suggesting region on a user interface for a user to configure the beacons; and generating the coordinates information of the beacons according to the location of the configured beacons.

6. The method for indoor robot positioning according to claim 1, wherein the step of detecting the beacons located within a line-of-sight area comprises:

receiving signals transmitted by the detected beacons;

determining an arrival time of the signal transmitted by the detected beacons;

determining the detected beacons within the line-of-sight area according to changes of the arrival time of the signal transmitted by the detected beacons;

determining the number of the detected beacons within the line-of-sight area; and determining the distance between the detected beacons and the indoor robot within the line-of-sight area.

7. An indoor robot, adapted to be configured in an indoor space, with a plurality of beacons configured in the indoor space, the indoor robot comprising:

a driving unit, configured for moving the indoor robot;

a memory, storing at least one positioning mode with two beacons detected;

a detecting unit, configured for detecting the beacons within a line-of-sight area and determining a number of the detected beacons within the line-of-sight area; and a processing unit couple to the driving unit, the memory, and the detecting unit, wherein when the number of the detected beacons is equal to 2, the steps performed by the indoor robot comprise:

obtaining a first distance data between the indoor robot at a first position and a first detected beacon of the two detected beacons, and obtaining a first distance data between the indoor robot at the first position and a second detected beacon of the two detected beacons;

determining two intersection points between a first circle and a second circle, the indoor robot at the first position being located at one of two intersection points, wherein the first circle is centered at the first detected beacon with a radius equal to the first distance data between the indoor robot and the first detected beacon, and the second circle is centered at the second detected beacon with a radius equal to the first distance data between the indoor robot and the second detected beacon, the two intersection points including a first intersection point and a second intersection point;

obtaining a position data of a first intersection point and a position data of the second intersection point;

driving the indoor robot, by the driving unit, to move a predetermined distance along a first direction to a second position;

obtaining a second distance data between the indoor robot at the second position and the first detected beacon, and obtaining a second distance data between the indoor robot at the second position and the second detected beacon;

determining two intersection points between a new first circle and a new second circle, the indoor robot at the second position being located at one of two intersection points, wherein the new first circle is centered at the first detected beacon with a radius equal to the second distance data between the indoor robot at the second position and the first detected beacon, and the new second circle is centered at the second detected beacon with a radius equal to the second distance data between the indoor robot at the second position and the second detected beacon, obtaining position data of the two intersection points;

calculating and obtaining a first position data of the indoor robot assuming that the indoor robot at the first position is located at the first intersection point and is moved the predetermined distance along the first direction to the second position;

calculating and obtaining a second position data of the indoor robot assuming that the indoor robot at the first position is located at the second intersection point and is moved the predetermined distance along the first direction to the second position;

comparing the first position data and the second position data of the indoor robot to the position data of the two intersection points between the new first circle and the new second circle when the indoor robot is at the second position, either the first position data or the second position data should match the position data of one of the two intersection points, and either the first position data or the second position data that matches the position data of one of the two intersection points is the position data of the indoor robot at the second position;

recording the position data of the indoor robot at the second position in the memory device of the indoor robot.

8. The indoor robot according to claim 7, wherein when the number of the detected beacons is equal to zero, the indoor robot records a movement direction and moves towards the opposite direction corresponding to the movement direction, for leaving from one specific area of the current present area in order to detect the beacons.

9. The indoor robot according to claim 7, further comprising:
an angle sensor, coupled to the processing unit, configured for detecting the movement direction of the indoor robot.

10. The indoor robot according to claim 7, wherein the indoor robot is a floor dust collector.

11. A method for indoor robot positioning, the indoor robot adapted in an indoor space and a plurality of beacons adapted in the indoor space, the method for indoor robot positioning comprising:
generating, by a processor in the indoor robot, an indoor map and coordinates information of the plurality of beacons, storing the indoor map and the coordinates information of the plurality of beacons in a memory of the indoor robot;
detecting, by a detecting unit, the beacons located within a line-of-sight area and counting the number of the detected line-of-sight beacons within the line-of-sight area; and performing one of a plurality of positioning modes according to the number of the detected beacons by the indoor robot;
wherein when the number of the detected beacons is equal to 1, the steps performed by the indoor robot comprises:
obtaining a first distance data between the indoor robot at a first position and the detected beacon;
driving the indoor robot, by a driving unit, to move a predetermined distance along a first direction to a second position;
obtaining a second distance data between the detected beacon and the indoor robot at the second position;
determining two intersection points between a first circle and a second circle, the detected beacon being located at one of two intersection points, wherein the first circle is centered at the indoor robot at the first position with a radius equal to the first distance data between the indoor robot and the detected beacon, and the second circle is centered at the indoor robot at the second position with a radius equal to the second distance data between the indoor robot and the detected beacon, the two intersection points including a first intersection point and a second intersection point;
calculating and obtaining a position data of a first intersection point and a position data of the second intersection point;
driving the indoor robot, by the driving unit, to move a predetermined distance along a second direction to a third position, wherein the first direction and the second direction are not parallel to each other;
comparing the second distance data and the third distance data, and determining which one of the two intersection points is the position of the detected beacon based on the comparison result of whether the third distance data is smaller or larger than the second distance data;
calculating and obtaining a position data of the indoor robot according to position of the detected beacon;
recording the position data of the indoor robot in the memory device of the indoor robot.

12. The method for indoor robot positioning according to claim 11, wherein when the number of the detected beacons is equal to zero, the indoor robot records a movement direction and moves toward the opposite direction corresponding to the movement direction, for leaving from one specific area of the current present area in order to detect the beacons.

13. The method for indoor robot positioning according to claim 11, wherein the step of generating an indoor map and coordinates information of the plurality of beacons comprises:
moving along edge of the indoor space;
generating a closed path according to the location of a charging base station;
generating the indoor map according to the closed path;
according to the indoor map, displaying a suggesting region on a user interface for a user to configure the beacons; and
generating the coordinates information of the beacons according to the location of the configured beacons.

14. The method for indoor robot positioning according to claim 11, wherein the step of detecting the beacons located within a line-of-sight area comprises:
receiving signals transmitted by the detected beacons;
determining an arrival time of the signal transmitted by the detected beacons;

determining the detected beacons within the line-of-sight area according to changes of the arrival time of the signal transmitted by the detected beacons;

determining the number of the detected beacons within the line-of-sight area; and determining the distance between the detected beacons and the indoor robot within the line-of-sight area.

15. An indoor robot, adapted to be configured in an indoor space, with a plurality of beacons configured in the indoor space, the indoor robot comprising:

a driving unit, configured for moving the indoor robot;

a memory, storing at least one positioning mode with one beacon detected;

a detecting unit, configured for detecting the beacons within a line-of-sight area and determining a number of the detected beacons within the line-of-sight area; and a processing unit couple to the driving unit, the memory, and the detecting unit, wherein when the number of the detected beacons is equal to 1, the steps performed by the indoor robot comprises:

obtaining a first distance data between the indoor robot at a first position and the detected beacon;

driving the indoor robot, by the driving unit, to move a predetermined distance along a first direction to a second position;

obtaining a second distance data between the detected beacon and the indoor robot at the second position;

determining two intersection points between a first circle and a second circle, the detected beacon being located at one of two intersection points, wherein the first circle is centered at the indoor robot at the first position with a radius equal to the first distance data between the indoor robot and the detected beacon, and the second circle is centered at the indoor robot at the second position with a radius equal to the second distance data between the indoor robot and the detected beacon, the two intersection points including a first intersection point and a second intersection point;

calculating and obtaining a position data of a first intersection point and a position data of the second intersection point;

driving the indoor robot, by the driving unit, to move a predetermined distance along a second direction to a third position, wherein the first direction and the second direction are not parallel to each other;

comparing the second distance data and the third distance data, and determining which one of the two intersection points is the position of the detected beacon based on the comparison result of whether the third distance data is smaller or larger than the second distance data;

calculating and obtaining a position data of the indoor robot according to position of the detected beacon;

recording the position data of the indoor robot in the memory device of the indoor robot.

16. The indoor robot according to claim 15, wherein when the number of the detected beacons is equal to zero, the indoor robot records a movement direction and moves towards the opposite direction corresponding to the movement direction, for leaving from one specific area of the current present area in order to detect the beacons.

* * * * *